United States Patent [19]

Grebenstein et al.

[11] 4,427,331
[45] Jan. 24, 1984

[54] EQUIPMENT FOR LIFTING, TRANSPORTING AND SETTING DOWN ELONGATE GOODS

[75] Inventors: Hermann Grebenstein, Unter-Erlinsbach; Jorge Speich, Thalheim, both of Switzerland

[73] Assignee: Oehler-Wyhlen-Lagertechnik AG, Buchs bei Aarau, Switzerland

[21] Appl. No.: 938,703

[22] Filed: Aug. 31, 1978

[30] Foreign Application Priority Data

Aug. 31, 1977 [DE] Fed. Rep. of Germany ....... 2739130
Nov. 11, 1977 [DE] Fed. Rep. of Germany ....... 2749414

[51] Int. Cl.³ ............................................. B65G 65/00
[52] U.S. Cl. .................................. 414/277; 414/659; 414/281
[58] Field of Search ............. 414/277, 282, 662, 659, 414/660, 663, 664, 668

[56] References Cited

U.S. PATENT DOCUMENTS

| | | | |
|---|---|---|---|
| 2,990,305 | 6/1961 | Richardson | 414/659 |
| 3,439,815 | 4/1969 | Wagner et al. | 414/277 |
| 3,602,379 | 8/1971 | Bosse | 414/282 |
| 3,792,758 | 2/1974 | Wentz | 414/277 |
| 4,063,653 | 12/1977 | Halada | 414/277 |
| 4,065,003 | 12/1977 | Hostettler | 414/277 |

*Primary Examiner*—Stephen G. Kunin
*Assistant Examiner*—Lawrence E. Williams

[57] ABSTRACT

Equipment for lifting, transporting and setting down an elongated group of goods, or individual goods arranged in a row one behind the other, comprising a lifting and transporting apparatus positioned longitudinally between two storage racks on which the goods are removed and are placed by said lifting and transporting apparatus which is in the form of a flexibly jointed roller chain driven by an endless roller chain with pawls in either direction, e.g., to or away from either rack. The lifting and transporting apparatus comprises a plurality of hingedly connected elongated shifting elements serving to raise the load, lower the load and support the load while moving by the roller chain in either direction. Each shifting element comprises a first lower U-profiled member, a second upper and capping U-profiled member slightly larger in width than the first member and an expansible swelling member in the space between the first and second members which displaces the second member upwardly or downwardly to the extent permitted by the inturned side walls of each of said first and second members in assembled condition in response to the pneumatic pressure to the swelling member. Effectively, each shifting element serves to raise the load for transport and lower it for placement in storage.

4 Claims, 13 Drawing Figures

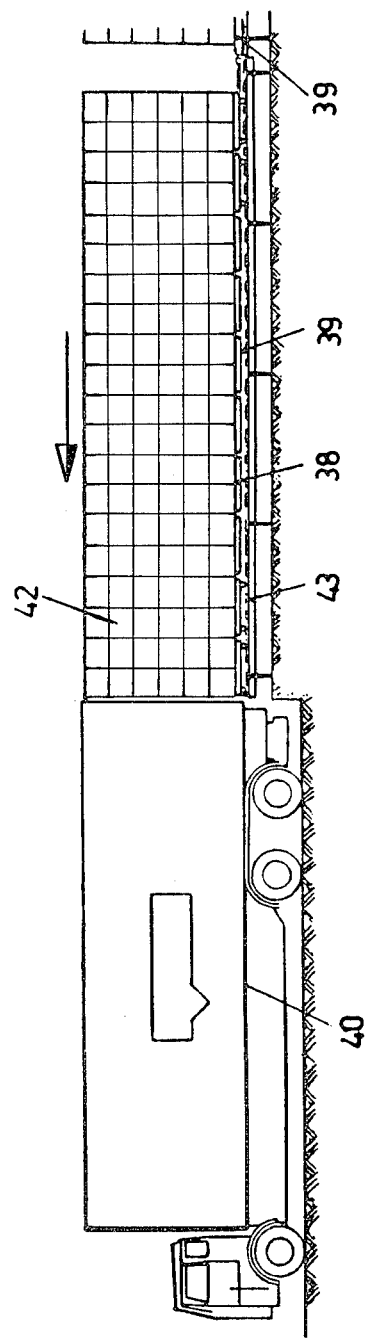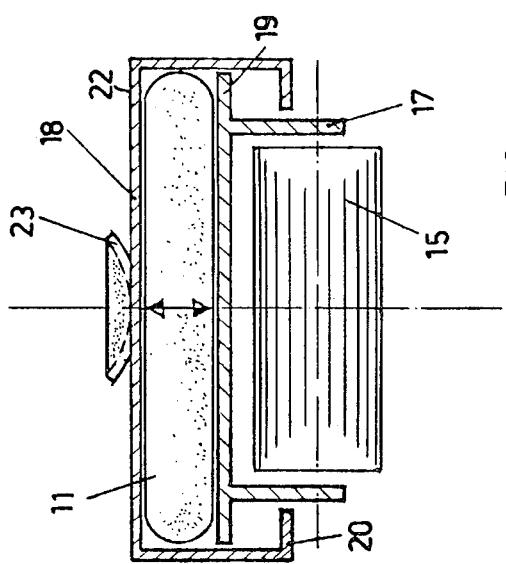
FIG. 9
FIG 5

EQUIPMENT FOR LIFTING, TRANSPORTING AND SETTING DOWN ELONGATE GOODS

BACKGROUND OF THE INVENTION

1. Field of the Invention

The present invention relates to an equipment for lifting, transporting and setting down elongate goods or individual goods arranged in a row one behind the other. The equipment is especially suitable for picking up and transporting loads out of space which is limited, narrow, and fixed to various movable storage locations. Furthermore, the equipment may also be used to take over a load from one roller conveyor to another adjacent one.

In particular, the invention provides an equipment for conveying long rows of boxes or other loads arranged in a row one behind the other one, whereby these loads have to be taken out of narrow and space-limited locations or have to be conveyed to such narrow locations. The equipment is also useful in such circumstances where the storage locations are not straight but conveying must be performed along a curved path. The equipment can be designed so as to be able to take over loads that are not received by especially constructed load receiving elements, such as pallets, which usually are easily handled.

2. Description of the Prior Art

Prior art solutions, which solve these problems mostly only in part or not adequately, have been described in German Patent Publication 2'205'505 and 2'509'028 and in the literature (Hepner: "Fördern und Heben" as well as Stöcklin, Article in the "Schweiz.-Handelszeitung").

Difficult problems have arisen with the known equipment in picking-out packages, boxes, pallets or the like from continuously running conveying equipment like roller conveyors, by means of transverse roller conveyors, or other transverse conveyors which engage between the individual rollers of the roller conveyor and which are raised under the influence of a single arm lever. These pick-out devices need a relative large distance between the individual rollers where the loads have to be picked out, thereby preventing small load pieces to be conveyed with such roller conveyors. A further disadvantage lies in the fact that the load is easily tilted when raised, causing a shift of the load on a pallet which is not securely fixed. Therefor it has already been proposed to use vertically displaceable lifting rails which are liftable through gaps in the roller conveyor. These lifting rails are connected to the main frame of the roller conveyor by linked parallelograms, thereby avoiding a tilt of the load, but resulting in a considerable horizontal shift during raising of the lifting rails and in long distances to be covered.

A further solution to this problem has been proposed by the present inventors in the German Patent No. 2'139'842, to give a construction which comprises two or more lifting rails arranged in spaced relationship transverse to the direction of conveying between the individual rollers of a roller conveyor. The lifting rails are vertically displaceable and are equipped with conveying means running along these lifting rails. The lifting rails are connected to a basic frame by means of two angular levers mounted on each side of said basic frame. The free arms of these angular levers are connected to an auxiliary frame which is driven by a motor by means of a connecting rod and an eccentric disc. The auxiliary frame is of a rigid construction and is moveable in horizontal direction by means of the to-and-fro motion of the connecting rod, driven by the motor and eccentric disc. This construction works very reliably and economically, but needs considerable space below the roller conveyor for the framework and require a quite large distance between the individual rollers.

OBJECTS OF THE INVENTION

It is an object of the present invention to provide equipment of the kind described above to solve all problems which have been discussed in the foregoing, which is simple in construction and by means of which the known constructions can be considerably improved and simplified. In particular, it is an object of the invention to provide equipment which needs much less space than the constructions of conventional design, enabling loads to be transferred also in space-limited locations and in connection with roller conveyors, the rollers of which are very tightly one besides the other. Finally, the equipment to be proposed should be drivable along curved paths.

SUMMARY OF THE INVENTION

The invention provides equipment for lifting, setting down and transporting elongate goods or individual goods arranged in a row one behind the other one which comprises load receiving elements for the lifting and conveying of goods with two members displaceable in relation to each other in vertical direction and driving means to displace said members relative to each other.

A further embodiment of the equipment of the invention consists in a construction to be used with two roller conveyors to transfer a load from one of the conveyors to the other one or to load or unload a roller conveyor and ensuring all of the advantages mentioned before. Such equipment comprises at least two conveying tongue trains consisting of a plurality of load receiving elements according to the invention each of these load receiving elements being equipped with two rollers. These conveying trains can be shifted into the space between two rollers of a roller conveyor, each of the load receiving elements having a member that can be raised and lowered in relation to the other member.

Preferably, the conveying tongue trains comprise a plurality of individual load receiving elements hinged together and being equipped with freely rotatable roller pins. The interconnection between the individual elements can be accomplished by freely movable rollers or by universal joints, e.g. in the form of a cardan joint.

The two members which are movable in vertical direction in relation to each other comprise two profile members, the amount of displacement being limited by extensions provided on each profile member, a swell member being provided in the space between the two profile members which can be increased or decreased in volume by pneumatically or hydraulically inflating or deflating the same.

BRIEF DESCRIPTION OF THE DRAWING

In the following, several embodiments of the equipment according the invention will be described further, by way of example only, with reference to the accompanying drawings, in which FIG. 5 shows another embodiment of a load receiving element in a view taken in cross section, FIG. 9 illustrates another embodiment in an arrangement for bulk-loading a lorry, in a side view.

DESCRIPTION OF THE PREFERRED EMBODIMENT

Figure 1A:
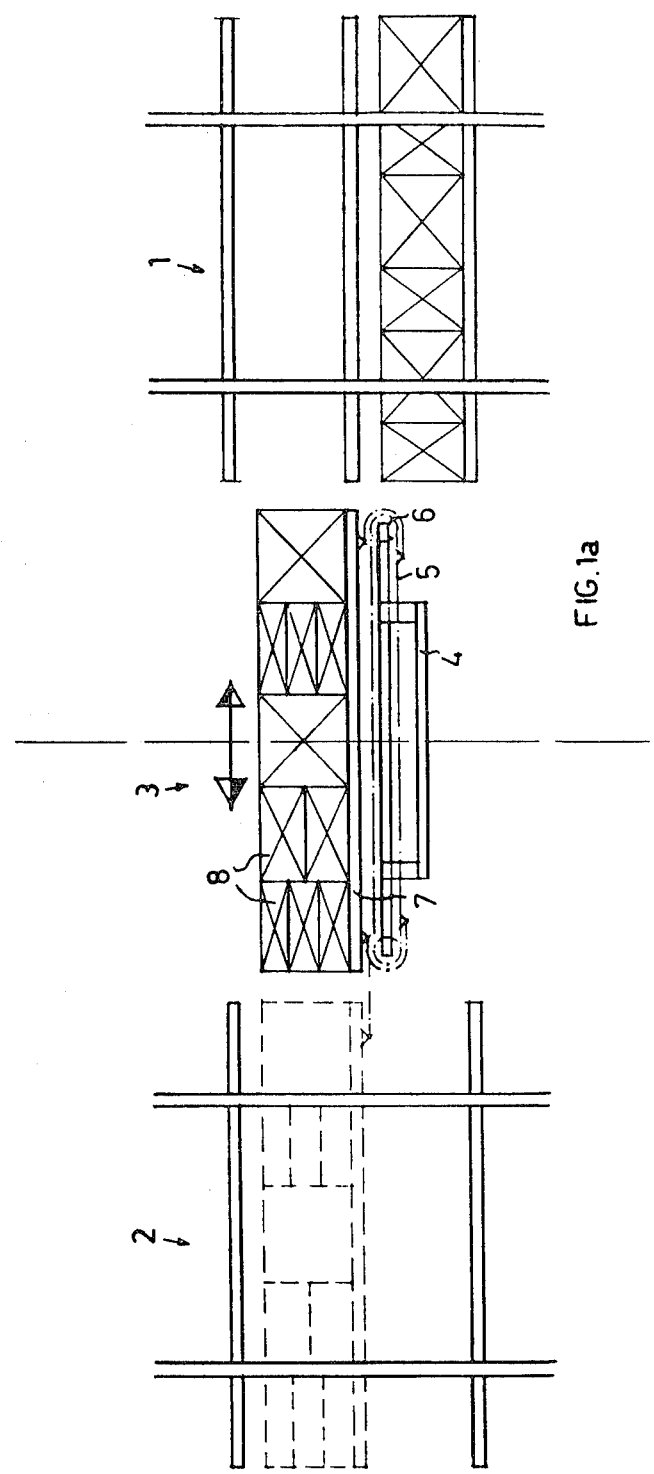
FIG. 1a illustrates schematic side elevation view of two storage racks with a lifting and transporting means serving as the load receiving element.

According to the embodiment shown in FIG. 1a there are provided two rows of storage racks 1 and 2, and in the space 3 between the two rows there is provided a lifting and transporting means, like a stacker crane for putting in and taking out the goods in the racks 1 and 2. The lifting and transporting apparatus is displaceable in a direction transverse to the direction of the rows of the storage racks 1 and 2. A lifting table 4 is provided on the lifting and transporting apparatus which comprises a chain pull means in the form of an endless roller chain 5, driven by a driving gear 6. The roller chain 5 has the purpose to displace a shifting element 7 in the direction of the double arrow, the shifting element being loaded with e.g. packages 8.

Figure 1B:
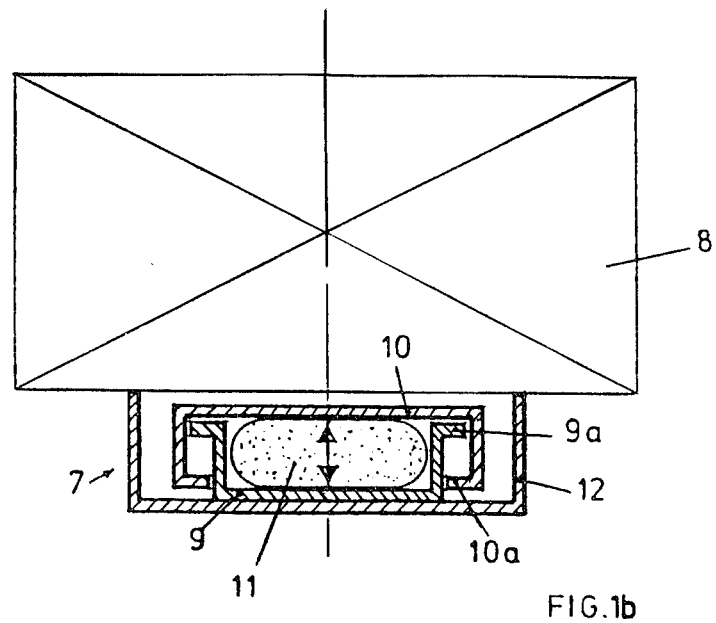
FIG. 1b shows a detailed cross section through the load receiving element of the lifting and transporting means FIG. 1a, FIG. 2 shows several load receiving lifting and transporting means connected together in a schematic side view.

The design of the shifting element 7 can best be seen in FIG. 1b. There can be seen that the shifting element 7 comprises a first lower, U-profiled member 9 and a second, inverted capping and upper, U-profiled member 10, which engage in such a way that they are displaceable in vertical direction relative to each other, the amount of displacement being limited by outwardly protruding extensions 9a provided on the first lower member 9 and by inwardly protruding extensions 10a provided on the second, upper member 10. An expansible member 11 is arranged in the space between the first, lower profile member 9 and the second, upper profile member 10, the volume of which can be increased or decreased either by hydraulic or pneumatic means. The two profile members 9 and 10 are arranged in a U-profiled support member 12 serving as a rail and being rigidly secured on the lifting table 4 of the lifting and transporting apparatus. Alternatively, the support member 12 may serve as the lifting table 4 of the lifting and transporting apparatus and may be raised and lowered in known manner.

Figure 2:
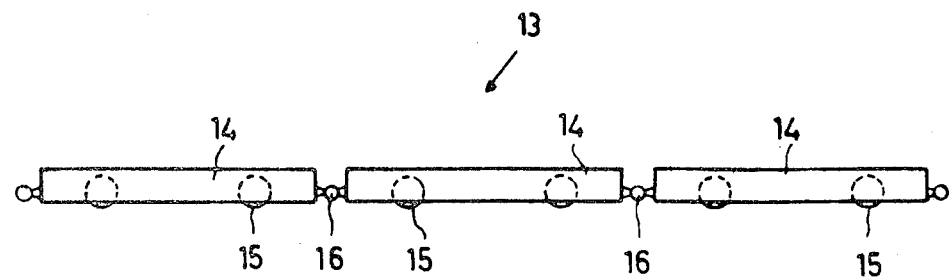
Figure 3:
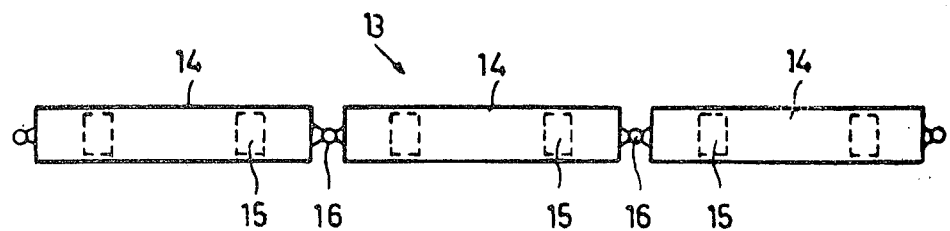
FIG. 3 illustrates a top view of the embodiment of FIG. 2.

The shifting element 7, comprising the lower profile member 9 and the upper profile member 10, is hingedly connected to the roller chain 5, whereby upon inflation of the swell member 11 the load 8 is taken off from the support member 12 and supported by the upper profile member 10. Now, the two profile members 9 and 10 can be jointly displaced in relation to the support member 12, enabling the load 8 to be conveyed in either direction of the arrow in FIG. 1a. As soon as the swell member 11 is deflated, the load 8 is set down on the support member 12 again. With this arrangement, the shifting element 7 of FIG. 1a, driven by the roller chain 5, is enabled to convey the load 8 either to the right into the racks 1 or to the left into the racks 2. Another embodiment and the basic features of various shifting elements are shown in FIGS. 2, 3, 4 and 10 and will now be described in detail. There is provided a plurality of individual transporting elements 14, e.g. three as shown in the embodiment of FIGS. 2 and 3, to form a conveying tongue train 13. Each of the individual elements 14 is provided with rollers 15, and the elements 14 are interconnected by means of bolts or universal joints 16 in the form of a Cardan joint coupling so that the conveying tongue train can be driven also along a curved path.

Figure 4:
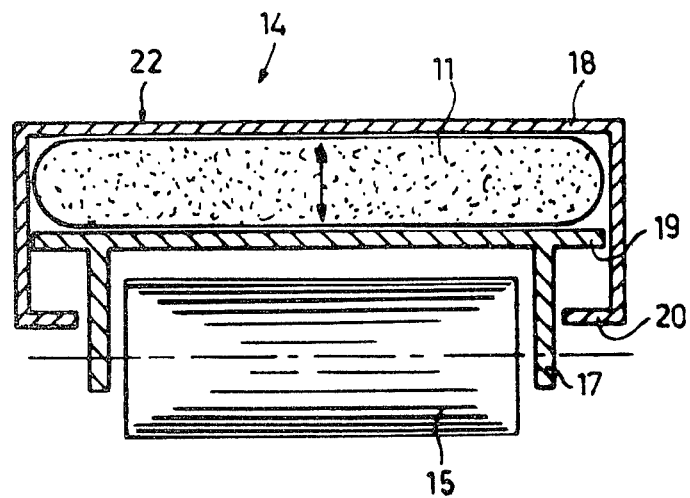
FIG. 4 shows a cross-section through the load receiving element of FIG. 2.

The detailed construction of the elements 14 can be seen from the enlarged cross section in FIG. 4. Each element 14 comprises a first, lower, U-profiled member 17 and a second, upper, U-profiled member 18 which engage each other so as to be displaceable in relation to each other in vertical direction. To limit the amount of displacement, the first, lower U-profiled member 17 is equipped with outwardly protruding extensions 19, which cooperate with inwardly protruding extensions 20 provided on the second, upper U-profiled member 18. Between the side walls of the first lower U-profiled member 17 are provided rollers 15 which are freely rotatable. In the embodiment of FIGS. 2 and 3, each element 14 is equipped with two rollers 15 arranged in spaced relationship. In the space between the two profile members 17 and 18 there is received a swelling member 11, the volume of which can be increased and decreased by pneumatic or hydraulic means e.g. by inflating or deflating. As can be seen from FIG. 10, a load placed on the upper surface of the upper profile member 18, e.g. a pallet 30 in FIG. 10, can be raised from the ground floor by inflating the swelling members 11 in each of the hingedly connected lifting elements 14 whereupon it can be transported away by driving the two conveying tongue trains.

To set the pallet 30 down on the ground floor, the swelling member 11 is deflated so that the profile member 18 drops in relation to the lower profile member 17 until the pallet 30 touches the floor. The raising and lowering of the upper profile member 18, i.e. the inflating and deflating of the swelling members 11 can be accomplished by hydraulic or pneumatic means, which can easily be controlled by means of control units of conventional design, which are not described further. As the elements 14 are hinged to each other, the loaded conveying train 13 can be easily driven even along a curved path.

According to FIG. 5, the upper surface 22 of the upper profile member 18 is provided with suction cups 23 which serve to fix this member to the undersurface of a load placed thereon. With this arrangement, the load is reliably secured against slipping off, especially when the elements 14 are driven along uneven or inclined paths. With this embodiment, it is advantageous to inflate the swelling members 11 pneumatically and to provide a further pneumatic connection to the suction cups. Thereby, upon inflation of the swelling members 11, the suction cups 23 can simultaneously be deaerated (pressed) to firmly hold the load placed thereon. Upon deflation of the swelling members 11, the suction cups will be aerated (released) so that the load is now free from the profile member 18. In this way it is possible to use the lowermost row of a rack for light packages, even if the lifting table of the lifting and transporting means cannot be lowered to the ground level of this row, and the conveying train can be driven down from the lifting table under the load to be transported.

The hinged coupling between the elements 14 enabling the conveying train to be driven along curved paths is especially advantageous in the freight compartments of cargo planes and ships. Another possibility is to use a steel rope with great flexural rigidity for the coupling of the individual elements 14.

Figure 10:
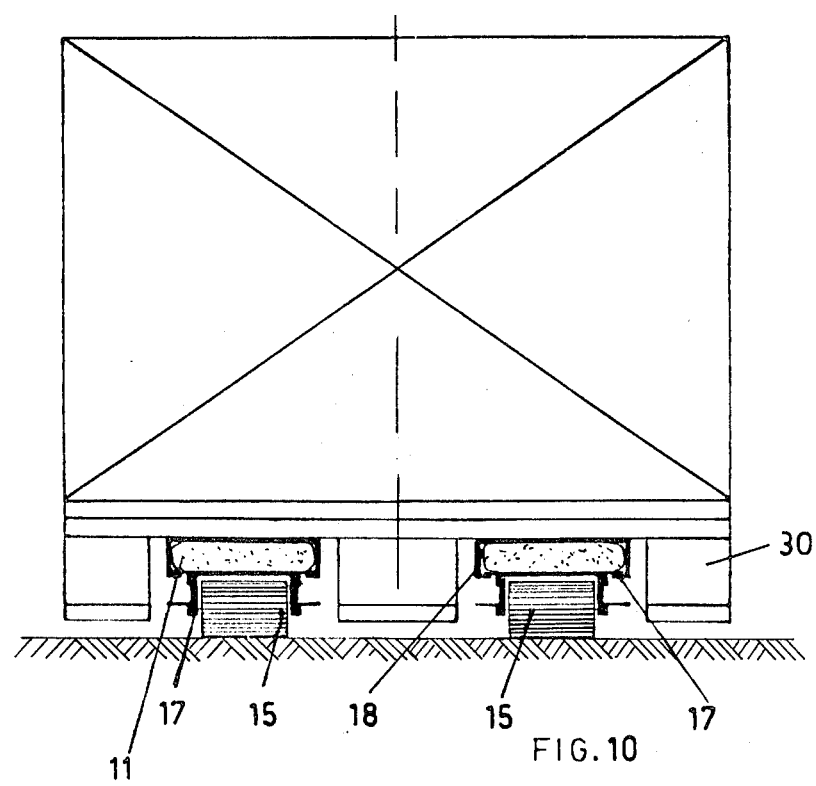
FIG. 10 shows a further embodiment of the load receiving element with a loaded pallet placed thereon.

The embodiment in FIG. 10 shows how two conveying tongue trains 13 are used to transport a number of loaded pallets 30, one placed behind the other to form a pallet row. Due to the flexible coupling between the elements 14, small differences in level, e.g. from one room to another one, can easily be overcome.

Figure 6:
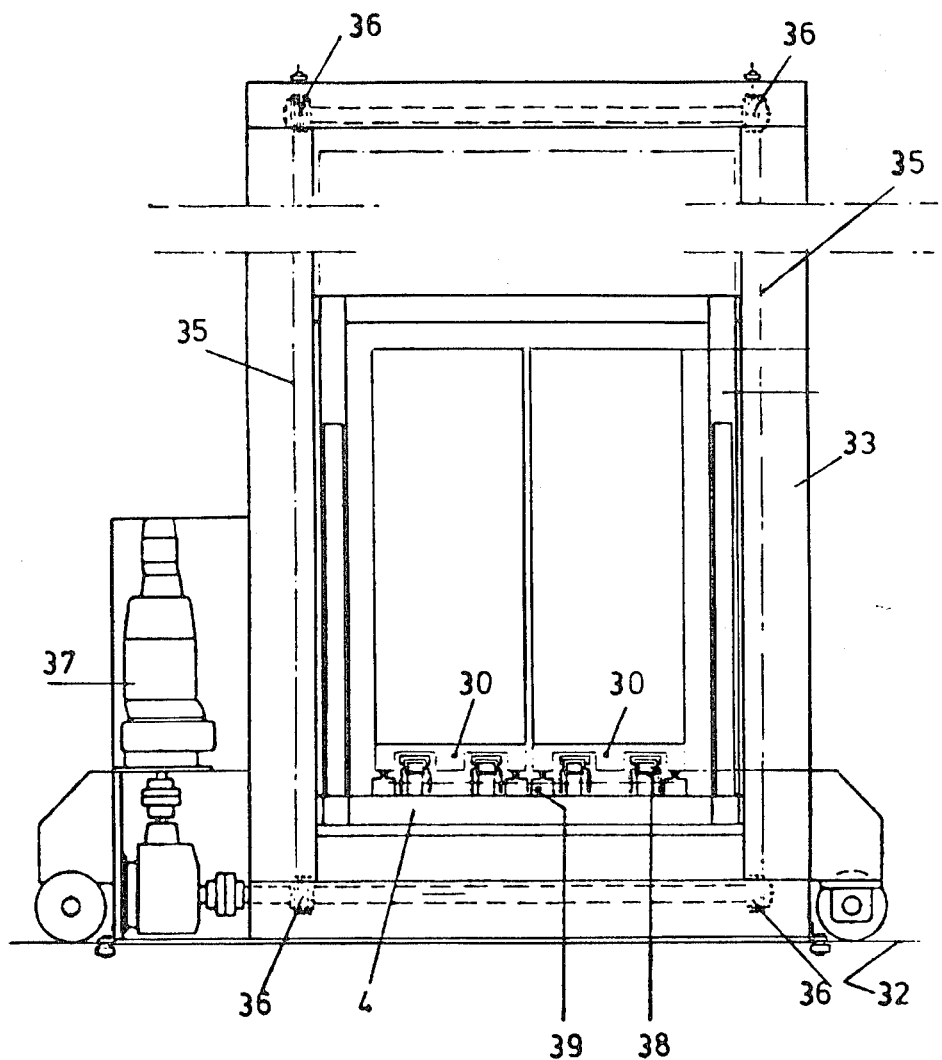
FIG. 6 illustrates the arrangement of two pairs of load receiving elements on the lifting table of a stacker crane, in a front view.

In FIG. 6 there is shown how the equipment according to the invention can be used with a stacker crane provided for the bulk sidewise loading of trucks, railway wagons or the like. The stacker crane 31 is displaceable on rails 32 and comprises a framework 33, which at its top is guided by a guiding rail (not shown) mounted at the roof of a warehouse. Within the framework 33 a lifting table 4 is received, which can be raised and lowered. The table 4 is suspended on two chains 35 which are guided and driven by sprocket wheels 36 by means of a driving gear 37 of conventional, well known design, e.g. an electric motor. The lifting table 4 is provided with four conveying tongue trains 38 to receive a total of four pallets 30. In the embodiment according to FIGS. 6 to 8, the conveying trains can be pushed-out and withdrawn only towards to one side.

Figure 7:
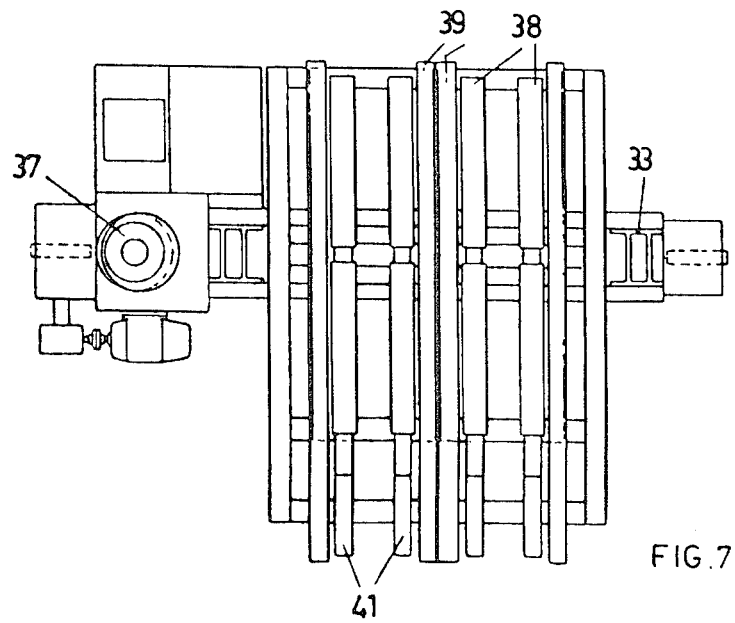
FIG. 7 shows a top view of the embodiment of FIG. 6.
Figure 8:
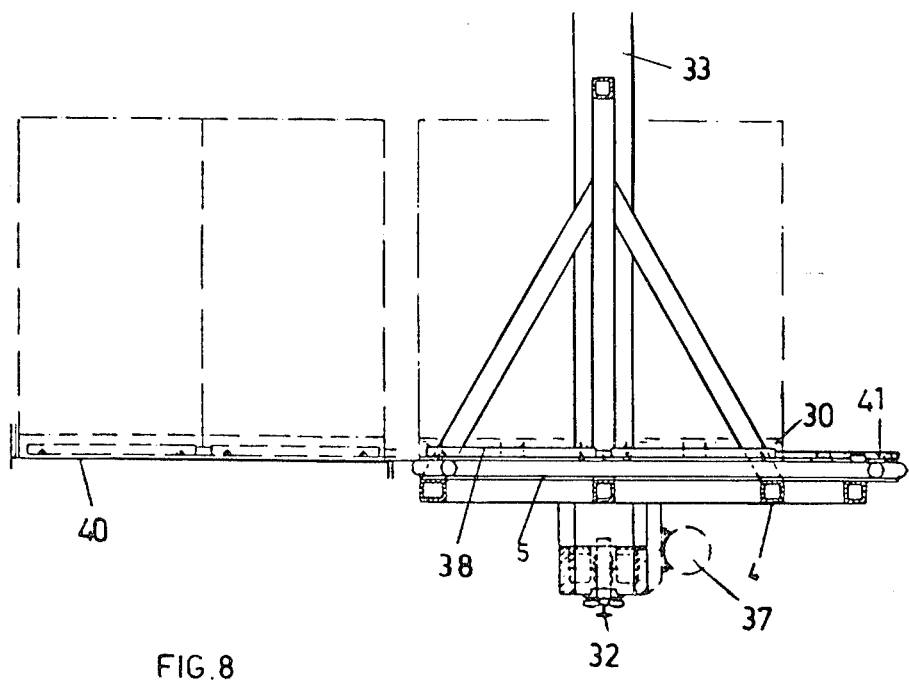
FIG. 8 shows a side view of the embodiment of FIG. 6.

For taking over the load from the other side, there are provided chain conveyors 39, comprising an endless conveying chain. The conveying tongue trains are driven out and pulled back by means of push-and-pull vehicles 41 with pawls (FIG. 7). In an analogous manner, the conveying tongue trains can be driven into racks or standby compartments of a warehouse (not shown) in order to take over pallets by inflating the swelling members 11 (FIG. 5). Then the loaded conveying trains are displaced on to the load receiving bridge 40 of e.g. a truck, where the swelling members 11 (FIG. 5) are deflated to lower the pallets on the floor of the bridge. Now the conveying trains are free from the pallets and can be pulled back onto the lifting table 4. To unload a truck, the proceeding as described above is simply reversed.

In FIG. 9 a truck is loaded from the back side with a total of 480 standardized packages 42. The packages are brought to the loading platform 43 by means of chain conveyors 39, then taken over by conveying tongue trains 38, the construction thereof described above, raised by inflating the swelling members 11 (FIG. 5) of the conveying tongue trains and displaced onto the load receiving bridge 40 of the truck, where they are set down by deflating the swell members of the conveying tongue trains. The bridge 40 of the truck has been fixed on the same level as the loading platform 43 in order to prevent a diving of the bridge under the influence of the load placed thereon. It may be advantageous when the bridge 40 of the truck comprises or consists of a plurality of lengthwise arranged U-profiled members to receive the packages. This enables the conveying tongue trains, when deflated, to be pulled back from the bridge 40 within the so formed U-channels without hindering.

Figure 11:
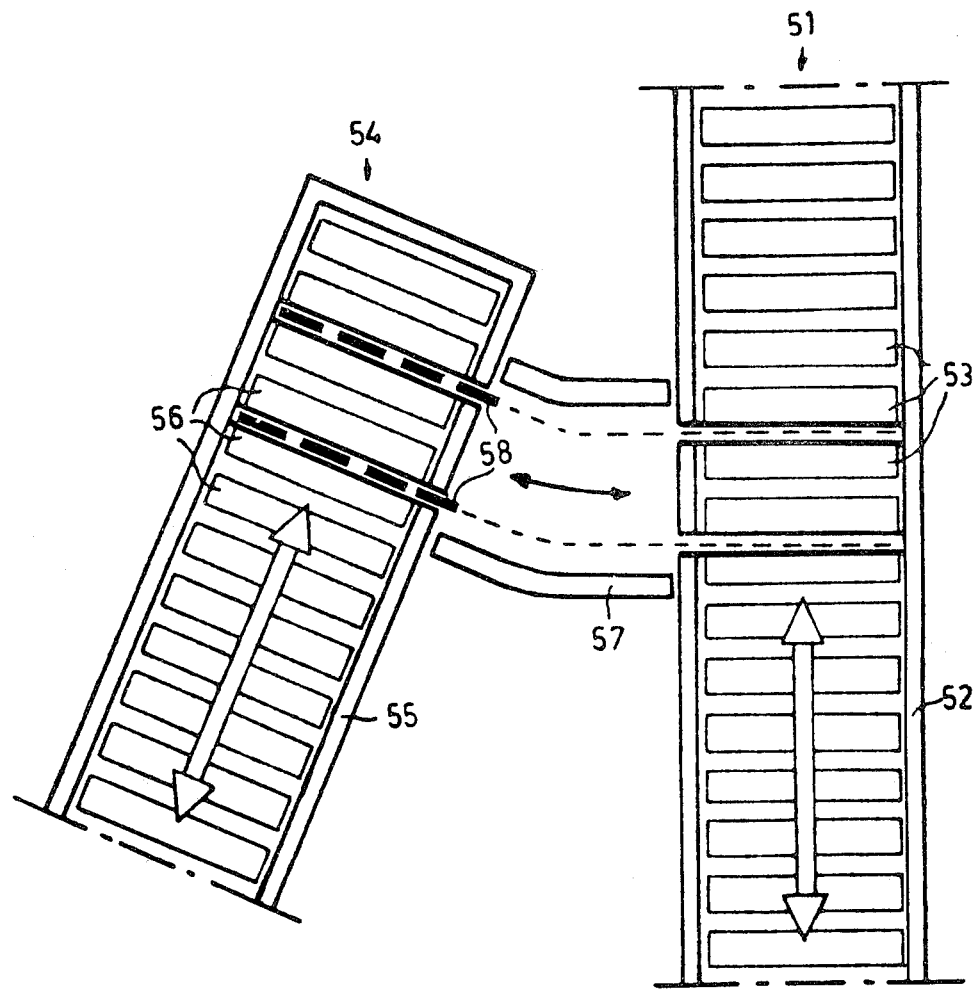
FIGS. 11 and 12 show a still further embodiment using two conveying tongue trains as a transfer means between two roller conveyors.
Figure 12:
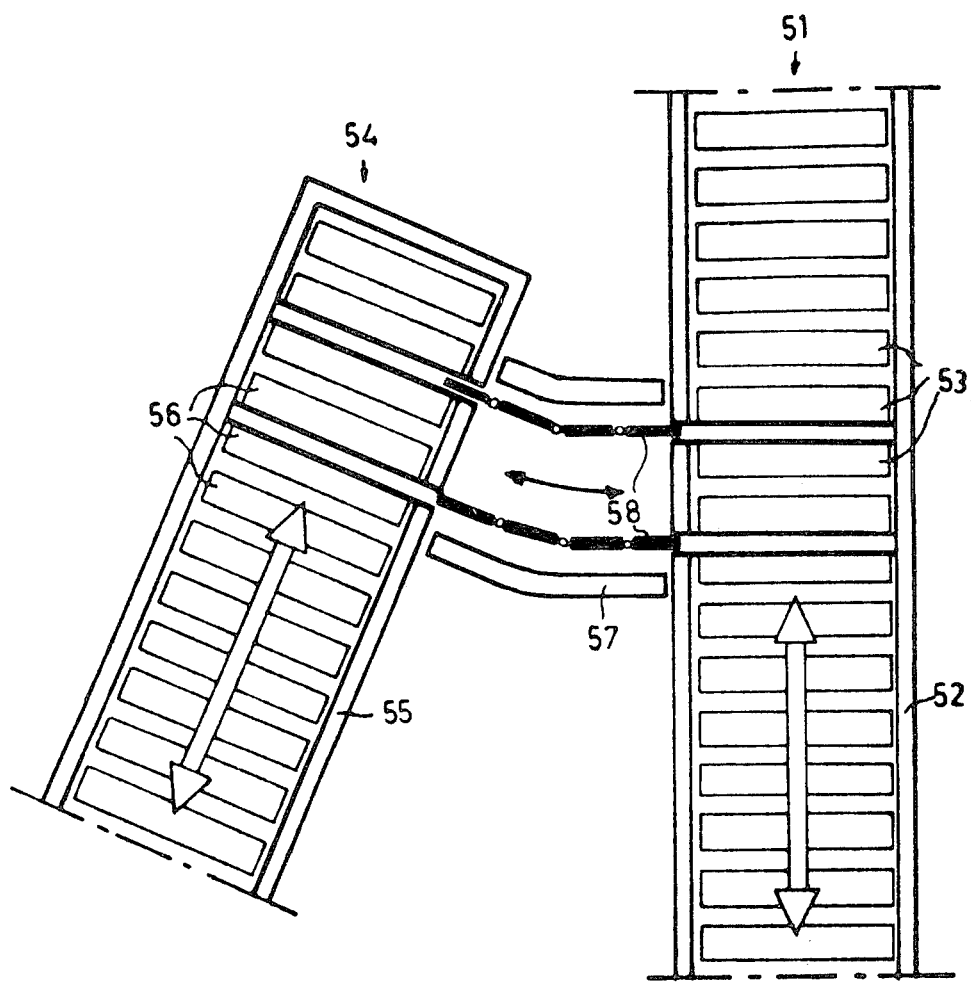

A further embodiment using the equipment according the invention is shown in FIGS. 11 and 12 and will now be described in more detail. The arrangement comprises two roller conveyors and two conveying tongue trains to displace a load from one of the roller conveyors to the other one. The conveying tongue trains are arranged perpendicularly to the conveying direction of the roller conveyors and are driven for example by means of endless roller chains of conventional design. The construction of the conveying tongue trains is substantially the same as described before.

As can be seen from the drawing, the arrangement comprises a main roller conveyor 51 with an elongated frame 52 which receives a plurality of driven rollers 53. Only a small part of the conveyor is shown in FIGS. 11 and 12; in fact it extends further in both directions. An auxiliary roller conveyor 54 ends in the region of the main conveyor 51 and is arranged in an acute angle to the latter one. The auxiliary conveyor 54 similarly comprises an elongated frame 55 in which a plurality of driven rollers 56 are received. The two conveying tongue trains have the purpose of transporting a load from the main conveyor 51 to the auxiliary conveyor 54 or vice versa.

The transverse conveyor, generally designated by 57, comprises two conveying tongue trains 58 the construction thereof being similar to the one as described in connection with FIGS. 2 to 4. The transverse conveyor 57 is placed in the space between the main roller conveyor 51 and the auxiliary roller conveyor 54 and is so aligned that the conveying tongues 58 can be displaced in the space between the rollers 53 resp. 56. In FIG. 11 there is shown the position where the conveying tongues are shifted to the left side, i.e. between the rollers 56 of the auxiliary roller conveyor 54. The conveying tongue trains are driven by means of roller chains (not shown) of conventional design, which are equipped with catches engaging the conveying tongues. Advantageously, there are provided U-profiled guide members for the conveying tongue trains so that the latters can be displaced in the space between the rollers 53 resp. 56 and pulled back again. The U-profiled guide members, providing a slide path for the conveying tongue trains, are not shown in detail, but are indicated by the two dashed lines in FIG. 11. To displace a load, which has arrived at the end of the auxiliary roller conveyor 54, to the main roller conveyor 51, the tongue trains 58 are driven between the rollers 56, its swelling members are activated to raise the load and the tongue trains together with the load now resting on the tongues are pulled back and shifted between the rollers 53 of the main conveyor 51. Then the swelling members of the tongue trains are deflated, the load thereby placed on the roller conveyor 51 and conveyed further in either direction of the double arrow.

The transverse conveyor as described above needs no space under the roller conveyors 51 and 54 and can even be used with roller conveyors which have a very small distance between the individual rollers. The transverse conveyor is of a very low profiled construction, is simply and rigidly constructed and works quickly and reliably.

In summary the equipment according to the invention provides optimum exploitation of a given limited storage space yielding an excellent storage factor, whereby both the free space and the load units can be kept very small. The design as shown and described in this invention can be used even if several pallets, one behind the other, have to be transported simultaneously, even though the technical expenditure is limited and the space available very small.

What we claim is:

1. Equipment for lifting, transporting and setting down elongated goods in a group or as individual pieces which are arranged in rows, one row behind the other in a narrow and space limited location comprising:

storage racks for each of said row of goods and pieces which are arranged in side by side relation with a space between said racks;

lifting and transporting means positioned longitudinally in said space between said storage racks which include a plurality of hingedly connected shifting elements to raise the goods or piece, shifting goods and lower the goods or piece and while supporting the goods during these operations;

driving means including a driving roller and a roller chain which move the shifting elements of said lifting and transporting means in either direction which is transverse to said racks so that the goods move to or away from either rack;

each said shifting element comprising a first lower U profiled member, a second upper U profiled member slightly larger in width than said first member to form a displaceable cap thereover and an expansible swelling member which lifts the load of said goods from lower member to transfer the goods to said upper member which provides support during movement of said shifting element to or away from said rack;

a pair of rollers below said shifting element to facilitate movement of said shifting element to or away from said rack;

a tongue projection for said roller chain which engages said plurality of shifting elements after inflation of said expansible swelling member.

a lifting table for mounting the plurality of hingedly connected shifting elements of said lifting and transporting means; and pneumatic means to inflate and to deflate said expansible swelling member.

2. Equipment as claimed in claim 1 including a stacker crane is provided to facilitate bulk loading of tracks, railway wagons and like vehicles and wherein the tongue projection for said roller chain forms a train of goods on said shifting elements for conveying said goods on said lifting table to said vehicles.

3. Equipment as claimed in claim 1 wherein said hingedly coupled shifting elements are coupled with a universal joint.

4. Equipment as claimed in claim 1 wherein the upper surface of said second upper U provided member is provided with suction cups, each of said cups adapted to be de-aerated or pressed and aerated or released by said pneumatic means to thereby stabilize said goods on said lifting table.

* * * * *